May 13, 1952  A. H. BAHNSON, JR  2,596,518
APPARATUS FOR CLEANING FILTER SCREENS
Filed Sept. 11, 1950  3 Sheets-Sheet 1
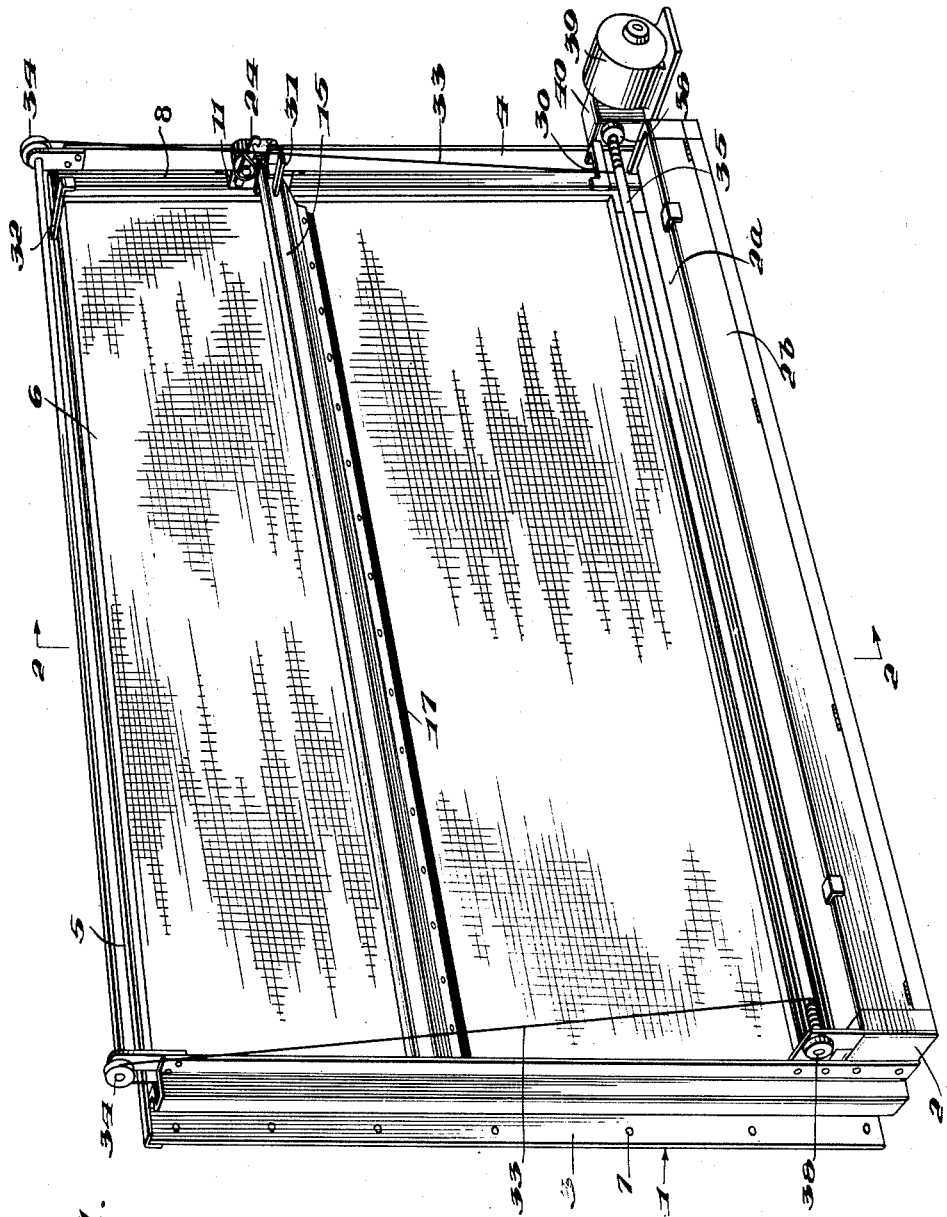
INVENTOR
Agnew H. Bahnson, Jr
BY Pierce, Scheffler & Parker
ATTORNEYS May 13, 1952 A. H. BAHNSON, JR 2,596,518
APPARATUS FOR CLEANING FILTER SCREENS
Filed Sept. 11, 1950 3 Sheets-Sheet 2
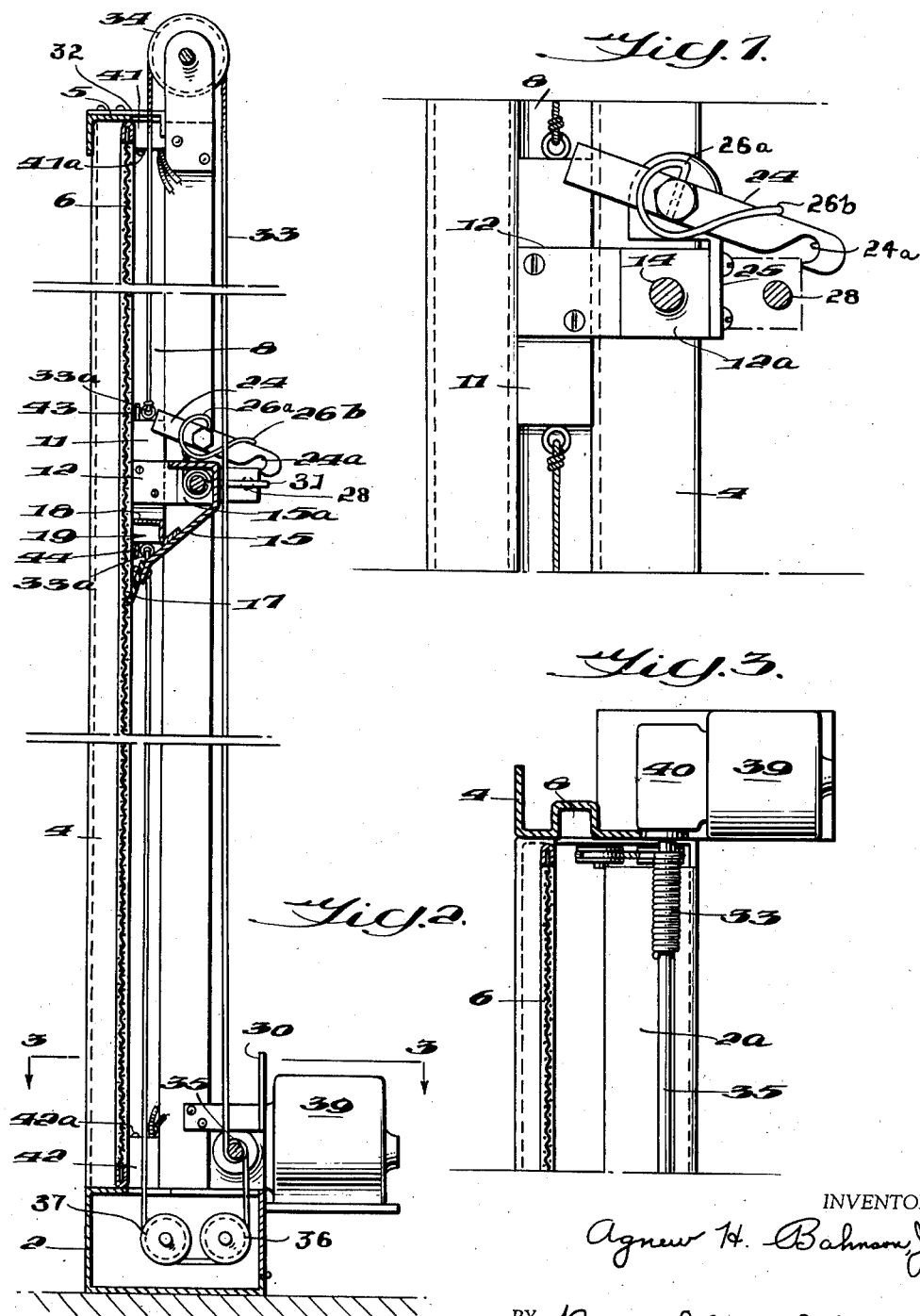

May 13, 1952  A. H. BAHNSON, JR  2,596,518
APPARATUS FOR CLEANING FILTER SCREENS
Filed Sept. 11, 1950  3 Sheets-Sheet 3
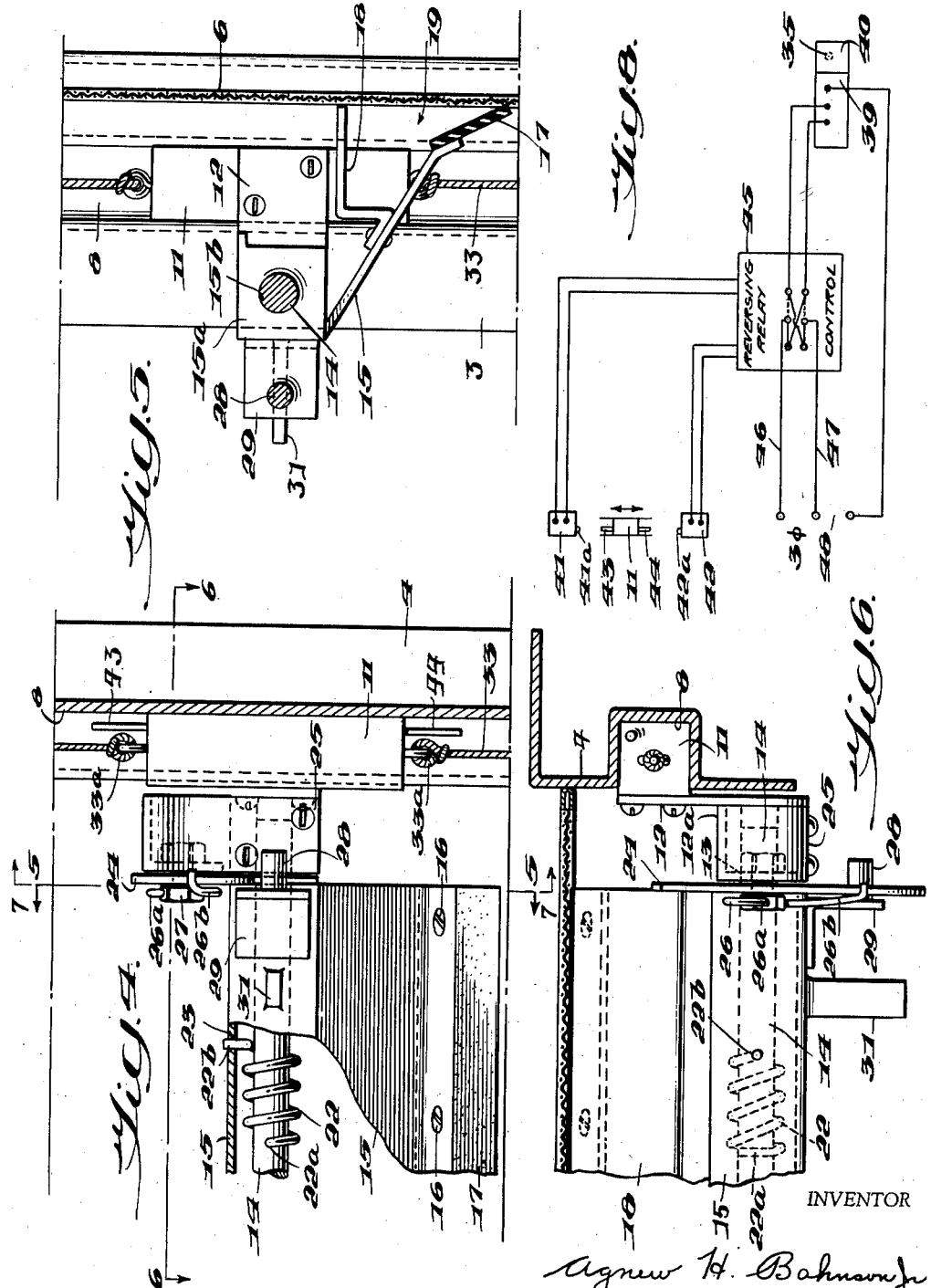

Patented May 13, 1952

2,596,518

UNITED STATES PATENT OFFICE 2,596,518

APPARATUS FOR CLEANING FILTER SCREENS

Agnew H. Bahnson, Jr., Winston-Salem, N. C., assignor to Katharine King Bahnson, Winston-Salem, N. C.

Application September 11, 1950, Serial No. 184,316

7 Claims. (Cl. 183—52)

The present invention relates to apparatus for cleaning air filters and more particularly to an improved device for stripping air borne material from filter screens of the flat, reticulated type through which the air is passed for recirculation in an air conditioning system.

In textile factories particularly, a considerable mass of lint usually becomes entrained with the recirculating air and is caught by the screen as the air passes through it. This lint must be removed periodically if a condition of low static pressure is to be maintained through the air opening across which the filter screen is placed, and it is a primary object of the present invention to provide an improved cleaning mechanism of the scraper type which will assure removal of all foreign matter stuck on the screen during the action of the scraping mechanism passing across the face of the screen.

A more specific object is to provide a filter screen cleaner comprising a scraper blade adapted to be passed downwardly across the screen with its scraping edge in contact with the surface of the screen and a trap chamber located immediately behind the blade in which is trapped and brought down any lint balls or rolls which may happen to be forced under and be left behind by the scraper blade thus assuring complete removal of all lint as the blade of the cleaner passes across the screen face.

The foregoing as well as other objects and advantages inherent in the invention will become more apparent from the following detailed description and accompanying drawings of one practical construction embodying the invention.

Fig. 1 of the drawings is a view in perspective of the complete screen and cleaning mechanism as seen from the front, or air intake side;

Fig. 2 is vertical section taken on line 2—2 of Fig. 1 and drawn to a somewhat larger scale;

Fig. 3 is a fragmentary horizontal section taken on line 3—3 of Fig. 2;

Fig. 4 is a fragmentary view in vertical section illustrating the structural detail at one side of the blade assembly;

Fig. 5 is a fragmentary view in vertical section taken on line 5—5 of Fig. 4;

Fig. 6 is a horizontal section taken on line 6—6 of Fig. 5;

Fig. 7 is a vertical section on line 7—7 of Fig. 4; and

Fig. 8 is a schematic wiring diagram of the control circuit for the motor which drives the cleaning mechanism.

With reference now to the drawings, and Fig. 1 in particular, the filter unit is comprised of a rigid, upright rectangular frame 1 made of metal. The bottom element of the frame is constituted by an elongated box 2 which serves as a receptacle for lint and other foreign matter removed from the filter screen; the sides of the frame are formed by substantially L-shaped plates 3, 4; and the top member 5 of the frame is shown as standard angle iron.

The reticulated filter screen 6 is secured along its marginal portions to the frame 1 and the entire unit is installed in filtering position by any suitable means such as by bolts (not shown) put through spaced holes 7 in the side plates 3, 4. Since the present invention is directed to the filter unit per se, it has not been considered necessary to illustrate any part of the air conditioning system with which it is associated. However it will be understood that the air to be conditioned is blown or drawn through the filter screen 6 under pressure for cleaning. The air conditioning may also include cooling or heating, moistening or drying but these factors are immaterial to the invention.

The top 2a of the box is open along the plane of the screen 6 to catch the falling lint removed by the stripping blade and a hinged clean-out door section 2b extending for the full length of the box is provided in the front wall to facilitate removal of the lint from the box when the latter needs emptying.

As shown particularly well in Figs. 1 and 6, each of the frame sides 3, 4, is provided with a rectangularly shaped channel 8 extending for the full length of the frame which serve as guides or runners for slides 11. Secured to each of the slides 11 is a plate 12 having a front portion 12a bent inwardly and back upon itself and apertured at 13 to provide a support for one end of a non-rotatable shaft 14 which extends across the screen 6 and has its opposite end supported in aperture 13 of the opposite plate 12.

Mounted by shaft 14 is a rigid, metallic support plate 15 located at the air intake side of screen 6. Plate 15 includes inturned flanged portions 15a having apertures 15b through which the shaft 14 passes thus rendering the plate 15 rotatable about the axis of the shaft. Plate 15 is generally coextensive in width with the filter screen 6 and projects downward and inward in the direction of the screen. Across the bottom edge of this plate is secured by spaced bolts 16 a stripper blade 17 which preferably is made of relatively stiff rubber. The edge of the blade bears against the screen surface at an angle of about 30° from the vertical, and the blade is of course renewed whenever judged no longer serviceable to perform its function of stripping lint and other foreign matter held against the screen face by virtue of the air suction through it. The included angle between screen 6 and blade 17 is not critical and hence the 30° angle illustrated may be departed from considerably.

It was explained at the outset that a principal feature of the present invention is the provision of a chamber located immediately behind the leading stripper blade 17 within which is trapped any lint balls or rolls that may become wedged under and be passed over by the blade during its downward course across the face of the filter screen. While most of the lint will be pushed ahead by the advance of the leading stripper blade 17 and drop down into the receptacle 2, some of it as it becomes balled or rolled up by the advancing motion of the blade may nevertheless be caught under the blade edge and be left behind. The trap chamber now to be described functions to catch and bring down this residue with the result that the filter screen is stripped clean as the blade passes across it.

Referring now to Figs. 2 and 5 it will be seen that plate 15 also acts as the support for a second, rigid blade-like member 18 extending horizontally in the direction of the screen 6 but terminating a short distance from it as distinguished from the leading blade 17, the edge of which actually engages the screen face at a substantial pressure. The two blades 17, 18 extend for the full width of screen 6 and together with the portion of the plate 15 included therebetween establish a chamber 19 open in the direction of the screen 6. Chamber 19 is also open at the opposite ends of the blades 17, 18 but this is immaterial. Due to the suction of air through the screen, a partial vacuum is created in chamber 19 throughout its length and such vacuum has been found most effective in trapping any lint rolls or balls which happen to be forced under the edge of blade 17. The lint so trapped is carried downward in the chamber and ultimately dropped into receptacle 2 since the downward stroke of the blade assembly is sufficient to carry the leading edge of blade 17 below the bottom edge of screen 6, thus opening the bottom of chamber 19 to the receptacle. Since the trailing blade 18 is also presented edgewise to the filter screen 6, the under face of blade 18 irrespective of the vacuum action also tends to bring down any lint mass collected in the trap chamber 19 by virtue of the mechanical contact of the lint mass with the blade face.

It is most important that the edge of the trailing blade 18 extend quite close to the surface of the screen 6 but it must not touch it for if the edge of blade 18 were to contact the screen, the blade edge would tend to squeeze the lint mass between it and the screen and the downward movement of the blade would create a friction tending to draw the lint mass behind the blade and re-deposit it on the screen.

The preferred and illustrated arrangement for the blade assembly is that in which the leading blade 17 engages the screen surface only during its downward stroke. At the end of the downward stroke, the blade assembly is swung away from the screen and remains in such position until it has reached the end of the return, upward stroke whereupon it is swung back to its other position with the leading blade 17 in contact with the screen surface. To effect such an arrangement it will be observed from Figs. 4, 6 and 7 in particular that plate 15 is loaded about shaft 14 in the direction of screen 6 by means of a loading spring 22 surrounding shaft 14. One end 22a of this spring is anchored to shaft 14 and the opposite end 22b is anchored in an aperture 23 provided in plate 15.

In order to hold the blade assembly away from the screen during its upward travel, use is made of a latching lever 24 pivotally mounted upon a bracket 25 which is secured to the front portion 12a of plate 12. A spring 2b has one end 26a anchored in the non-rotatable head of pivot pin 27 and the other end 26b bears upon the forward end of lever 24 containing the notch 24a thus loading this forward end downwardly to the latched position shown in Figs. 1 and 7.

Cooperative with the notch 24a in lever 24 is a latch pin 28 extending laterally from a bracket 29 secured to the rear face of plate 15. Pin 28 is adapted to engage and be held in the notch 24a when plate 15 is swung away from the screen 8. This action takes place as the plate 15 carrying the blades approaches its lowermost position there being provided a trip arm 30 at the lower part of the screen frame which engages a complementary trip arm 31 carried by plate 15 thus rotating the latter away from the screen and pin 28 into notch 24a. When the plate 15 is reversed in direction and nears its uppermost position, a trip arm 32 secured to the upper end of the screen frame presses upon the rear end of lever 24 and rotates the latter against the countertorque of its loading spring 26 to release pin 28 whereupon the loading spring 22 works to swing the plate 15 back to the position shown in Fig. 5 with the blade 17 bearing against the surface of screen 6.

For advancing the blade assembly across the face of the screen 6 from top to bottom and reversing its motion to the starting position, a cable type of drive has been shown. The cable system for the motor side of the frame and which is shown in detail in Fig. 2 is comprised of a loop of cable 33, the terminal ends 33a of which are anchored respectively to the top and bottom faces of the block sides 11. From the upper face of block 11, cable 33 extends to the top of the screen frame, passes over pulley 34 to change its direction by 180°, makes three or four turns around a horizontal drive shaft 35 located near the bottom of the screen frame, passes across pulleys 36, 37 to again reverse its direction by 180° and thence back to its anchor point on the bottom face of slide 11. A similar cable and pulley system is provided at the opposite side of the screen frame for the other guide block 11. Opposite ends of drive shaft 35 are received in bearings 38 and a 3φ alternating current motor 39 drives the shaft 35 through reduction gearing of conventional manufacture housed within gear box 40.

It will be understood that the blade assembly may be driven by other means such as for example by a chain and sprocket arrangement in which case the chain would perform the function served by cable 33 and the sprockets would take the place of the pulleys.

Motor 39 is reversible and the present invention includes a limit switch arrangement for reversing the direction of the motor and hence the direction of travel of the blade assembly when the latter reaches the upper and lower limits of its movement. To this end, it will be observed that limit switches 41 and 42 (see Fig. 2) are placed at the top and bottom of screen 6. The contact actuating button 41a on the upper switch 41 is placed in the path of a pin 43 upstanding on slide 11, and the contact button 42a of lower switch 42 is similarly located in the path of pin 44 depending from this same slide. The contacts of switches 41, 42 are arranged in a conventional reversing switch control shown schematically only in Fig. 8 and which includes a reversing relay 45 controlled by the switches that functions to reverse two of the three motor leads 46, 47 extending from the 3φ power terminals 48 and hence also reverse the direction of motor rotation each time the contacts of either switch are actuated momentarily by the pressure from the pins 43, 44. Cleaning of the filter screen can be made selective at the will of the user in which case suitable switches would be included in the Fig. 8 diagram to connect the power source of motor 39; or operation of the filter screen cleaner can be made automatic in which case suitable timer mechanism would be incorporated in the control to effect periodic operation of the cleaner. The latter is generally preferable since it provides a practical expedient for purposely permitting a lint mat to collect on the screen in order to provide air filter action during the time the lint mat is collecting but yet removes the mat frequently enough to hold the static pressure down to the desired level.

In conclusion, it is to be understood that the embodiment of my invention hereinabove described is but typical of the various structural arrangements possible within the scope of the invention as defined by the appended claims.

I claim:

1. Apparatus for stripping lint and like material from a flat filter screen through which air is adapted to be passed under pressure comprising a blade having its edge in contact with the face of said screen at the air intake side thereof, means for advancing said blade across the face of said screen to strip the lint therefrom, and means providing a trap chamber contiguous to and following said blade as related to the direction of blade movement for collecting lint passed thereunder, said chamber being generally coextensive in length with said blade, open along one side thereof to said screen and adapted to have a partial vacuum created within the same by the air suction through said screen.

2. Apparatus for stripping lint and like material from a flat filter screen through which air is adapted to be passed under pressure comprising a blade having its edge in contact with the face of said screen at the air intake side thereof, means for advancing said blade across the face of said screen to strip the lint therefrom, and a trap chamber located contiguous to said blade and following the same as related to the direction of blade movement for collecting any lint passed thereunder, said trap chamber having one wall thereof formed by said lint stripping blade and another wall formed by a second blade the edge of which terminates short of the face of said screen, said chamber being open to said screen between said walls and adapted to have a partial vacuum created within the same by the air suction through the screen.

3. Apparatus for stripping lint and like material from a flat filter screen through which air is adapted to be passed under pressure comprising a vertical frame having said filter screen secured thereto, said frame including a pair of side members provided with longitudinally extending guides, a slide disposed in each guide, a blade assembly carried by and extending between said slides at the air intake side of said screen, said blade assembly including a leading blade having its working edge in surface contact with said screen and a trailing blade the edge of which is spaced slightly away from the screen surface, said blades comprising walls of a trap chamber open between said walls to said screen and adapted to have a partial vacuum created therein by the air suction through said screen, and motor power means for advancing said blade assembly downwardly over the face of said screen.

4. Apparatus for stripping lint and the like from a filter screen as defined in claim 3 and which further includes means for reversing the direction of said motor means and hence reversing said blade assembly at the upper and lower limits of movement thereof.

5. Apparatus for stripping lint and like material from a flat filter screen through which air is adapted to be passed under pressure comprising a vertical frame to which said screen is secured, a pair of slides arranged for sliding movement in guides extending longitudinally of said frame side members, a plate extending across said screen at the air intake side thereof and supported by said slides, a lint stripping blade secured to said plate with the blade edge in contact with the face of said screen, a trailing blade following said lint stripping blade, said trailing blade being secured to said plate and having its edge terminated short of the face of said screen, said blades and plate also forming walls of a trap chamber open between said walls to said screen for collecting lint passed under said lint stripping blade and in which chamber a partial vacuum is created by the air suction through the screen, and means for moving said slides in said guides thereby to advance said blades and trap chamber downwardly across said screen.

6. Apparatus for stripping lint and like material from filter screens as defined in claim 5 wherein said plate includes means supporting the same for rocking movement about its longitudinal axis, and which further includes tripping devices at the upper and lower limits of movement of said plate effective respectively to shift said plate and blades towards and away from the face of said screen.

7. Apparatus for stripping lint and like material adhering to a vertically disposed air filter screen comprising a blade assembly including a leading blade having its edge in contact with the face of said screen at the air intake side thereof and a trailing blade disposed rearwardly of said leading blade as related to the direction of movement of said leading blade with the edge thereof spaced slightly from the screen face, the space between said blades forming walls of a chamber for trapping any lint forced under and passed by the edge of said leading blade, the pressure in same chamber being reduced by the flow of air past said leading blade through said screen, and means for advancing said blade assembly downwardly across the face of said screen.

AGNEW H. BAHNSON, Jr.

REFERENCES CITED

The following references are of record in the file of this patent:

UNITED STATES PATENTS

| Number | Name | Date |
|---|---|---|
| 1,118,304 | Mick | Nov. 24, 1914 |
| 1,429,006 | Wilharm | Sept. 12, 1922 |
| 1,791,574 | Pauly | Feb. 10, 1931 |

FOREIGN PATENTS

| Number | Country | Date |
|---|---|---|
| 255,876 | Germany | Jan. 23, 1913 |